United States Patent
Braun et al.

[19]

[11] Patent Number: 5,832,195
[45] Date of Patent: Nov. 3, 1998

[54] PEER-TO-PEER FAULT IDENTIFICATION

[75] Inventors: Scott D. Braun, Slinger; David W. Siegler, New Berlin; James S. Rustad, Jackson, all of Wis.

[73] Assignee: Allen-Bradley Company, LLC, Milwaukee, Wis.

[21] Appl. No.: 752,506

[22] Filed: Nov. 20, 1996

[51] Int. Cl.[6] .................................................. G06F 11/00
[52] U.S. Cl. ........................ 395/181; 395/182; 395/22; 395/183.19
[58] Field of Search ................ 395/181, 183.19, 395/185.08, 200.38, 200.39, 185.09, 182.02, 200.75; 371/62; 364/267.9

[56] References Cited

U.S. PATENT DOCUMENTS

| | | | |
|---|---|---|---|
| 4,610,013 | 9/1986 | Long et al. | 371/9 |
| 5,390,326 | 2/1995 | Shah | 395/185.08 |
| 5,461,608 | 10/1995 | Yoshiyama | 395/183.19 |
| 5,483,520 | 1/1996 | Eychenne et al. | 395/181 |
| 5,483,535 | 1/1996 | McMillen et al. | 370/85.1 |
| 5,544,332 | 8/1996 | Chen | 395/288 |

*Primary Examiner*—Robert W. Beausoliel, Jr.
*Assistant Examiner*—Scott T. Baderman
*Attorney, Agent, or Firm*—Michael A. Jaskolski; John M. Miller; John J. Horn

[57] ABSTRACT

A method and apparatus to be used with a peer-to-peer network including a plurality of separate controllers which can control each other, the method and apparatus to be used to determine when a fault conditions occurs when one controller which has controlled a different controller is rendered incapable of network communication. In the present invention, each individual controller includes a control list which tracks all of the other controllers that have controlled the individual controller. When one of the controllers on a control list is rendered incapable of communicating with the individual controller, the controller that is incapable of communicating is cleared from the control list associated with the individual controller and the tools associated with the individual controller are forced into safe fault operation until controlled by an other controller.

19 Claims, 6 Drawing Sheets

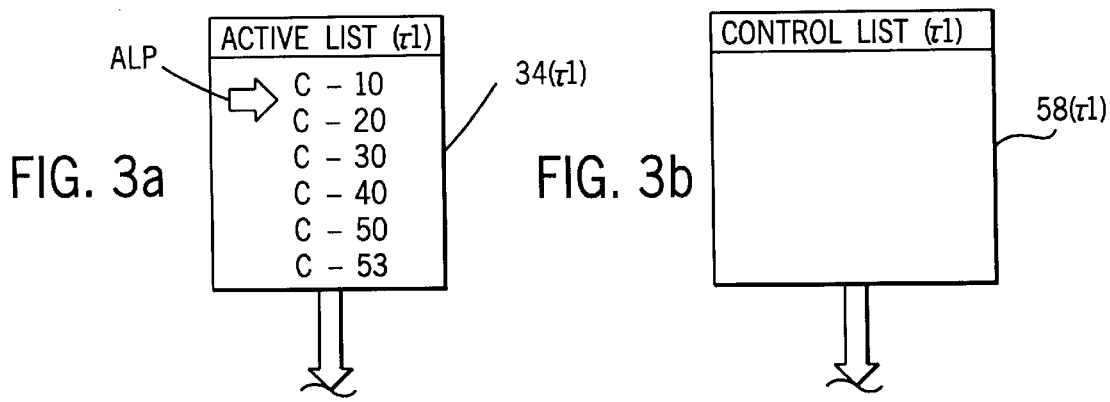
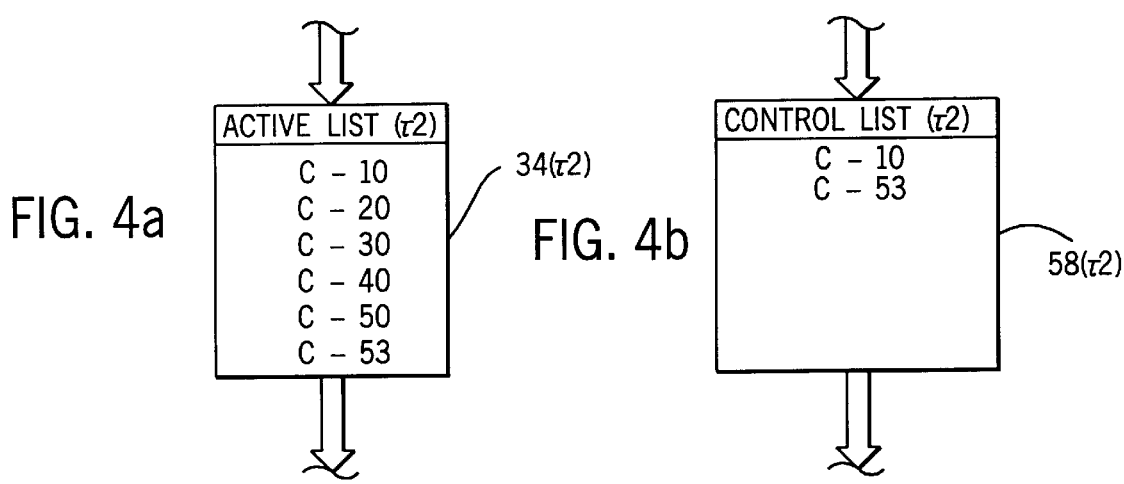
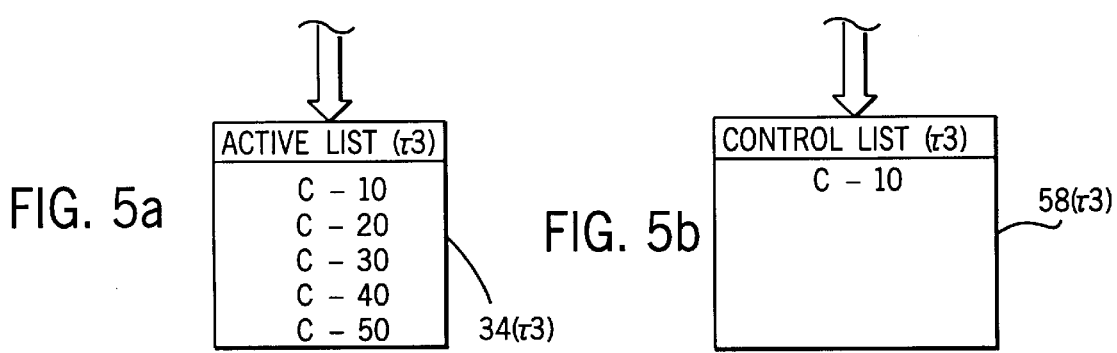

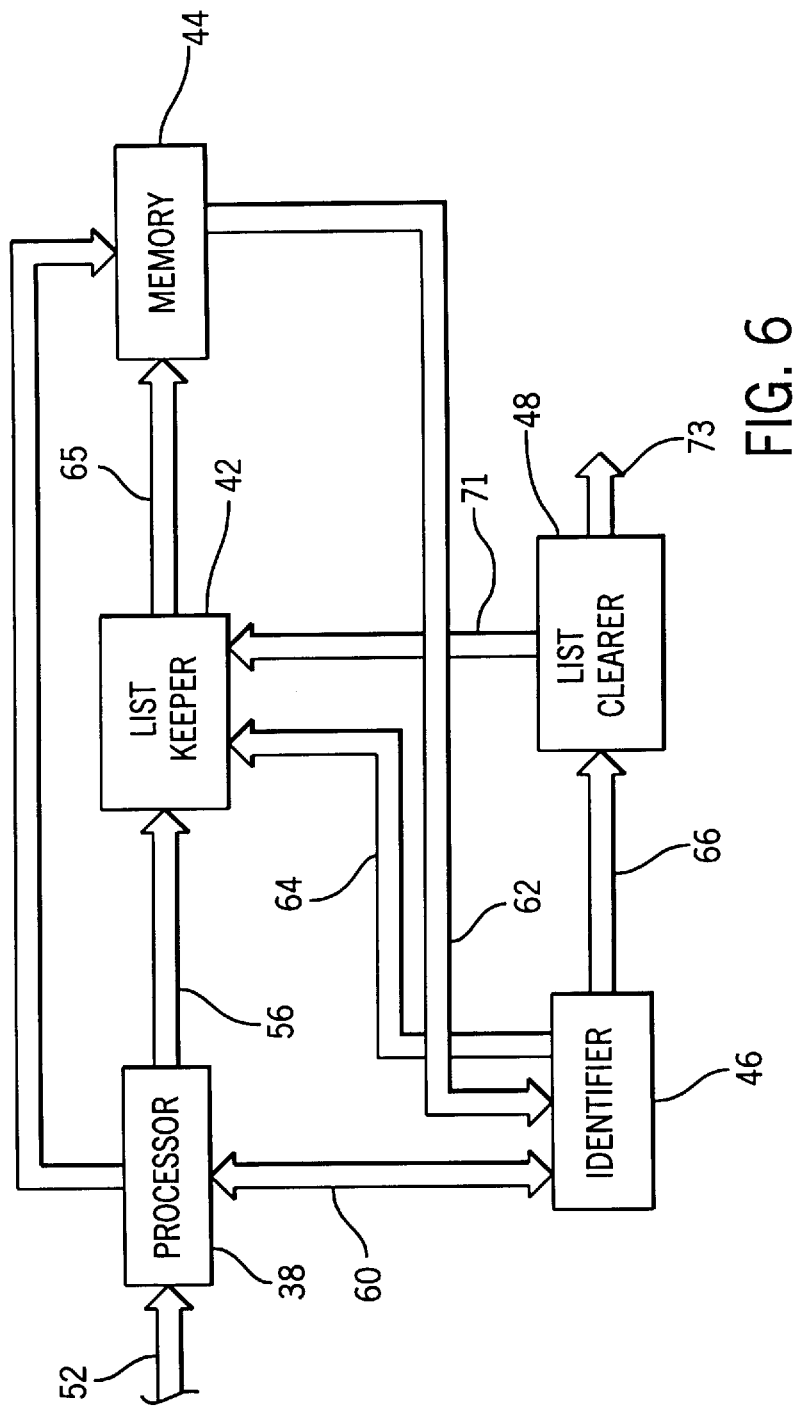

PEER-TO-PEER FAULT IDENTIFICATION

FIELD OF THE INVENTION

The field of the invention is industrial control systems and particularly safe peer-to-peer control networks with defined fault conditions.

BACKGROUND OF THE INVENTION

Factories are automated by controllers that are programmed or configured to operate specific machinery. These controllers can be general purpose, such as computers, numerical controls or programmable controllers; or they may be special purpose controllers such as robot controllers, weld controllers or motor drives. Each controller connects to various sensing and operating devices on the machinery which it controls and it automates the operation of that machinery by receiving data from the sensing devices and providing control data to the operating devices.

While a single controller may automate a machine or a small group of machines, such "islands of automation" must be connected together to truly automate an entire factory. These connections are provided by industrial local area controller networks that enable each controller to send messages to other controllers in the factory via a data bus.

A control scheme is required to provide an orderly transfer of information from one controller to another network controller. The most primitive control systems are referred to as master-slave systems wherein a master controller is responsible for controlling operation of a network including a plurality of slave controllers. The master controller "polls" the slave controllers for machine information and determines how other slave controllers should be controlled as a function of the received information. Thus, the slave controllers are dependent on control data from the master controller and are in effect linked together via the master controller and cannot communicate directly with each other.

In any industrial control system where many machine tools have to operate together one of the most important concerns is operation safety. Thus, where safe operation of a first controller and associated tools is dependent on the status of tools associated with a second controller, where the second controller becomes inoperable for some reason (e.g. malfunctions or is knocked off line), the first controller and associated tools should be forced into safe fault operation until the second controller is again rendered operable.

In master-slave systems all network control is tied to the central master controller and therefore the master controller can operate as a fault clearing house identifying well defined fault conditions when one or more of the slave controllers becomes inoperable. For example, for the purpose of this explanation it will be assumed that an automated line includes several motors that power drilling spindles and mills controlled by slave controllers. The slave controllers in turn are controlled by a master controller. It will also be assumed that operation of a specific drill cannot take place until a specific milling operation has been completed and an associated milling tool has been parked in a returned position. Once parked, the milling controller sends a return message to the master controller indicating the status of the milling tool.

The master controller monitors information from the mill controller and causes the drill controller to turn on the drill only after the returned mill message has been received and while the mill controller remains operational. Where the mill controller status can no longer be polled by the master controller (e.g. the mill controller malfunctions or is knocked off line), the master controller identifies the inoperable mill controller and can force the drill controller into safe fault operation. In this case, among other things, the master controller may cause the drill controller to be parked in a safe returned position.

In another scenario, the master controller may become inoperable after causing the drilling process to start. Where the master controller is rendered inoperable, to ensure safe control tool operation, all of the controllers connected thereto cause associated machinery to assume safe fault operation. Thus master-slave systems have well defined fault conditions which are routinely monitored by the master controller and can be used to force safe fault operation when required.

While master-slave systems are safe, master-slave systems have at least two important shortcomings. First, when a master controller malfunctions, an entire control network has to be driven into fault operation. While this may be acceptable in some applications, in industrial control fault operation of even a single automated line can severely reduce productivity, not just of the inoperable line, but also of an entire factory where other automated lines depend on output from the inoperable line.

In addition, master-slave systems are limited by the processing and hardware support abilities of the master controller. For this reason master-slave systems are not very flexible.

Another type of control system includes what are generally referred to as "peer-to-peer" communication networks. In peer-to-peer networks all of the controllers are connected by a serial data link over which each controller can communicate with all other network controllers to request status information, reconfigure controller software and control operation of tools associated with the other controllers. Those systems may not include a master controller since all controllers can operate at the same hierarchical level, hence the term peer-to-peer.

One common type of peer-to-peer system includes a "token" which is passed from one controller to another in an ordered and sequential fashion such that, during a network cycle, each controller has a slice of time during which it can send messages to other controllers for diagnostic, configuration, or control purposes. For example, in a peer-to-peer system there may be five different stations along an automated line including links for five different controllers. A first of the five links may have a stationary control panel controller connected to it while one of the remaining four links may be configured to support a hand held controller.

Among other capabilities, each of the control panel and hand held controllers may by capable of independently controlling a mill controller connected to a third of the five links and a drill controller connected to a fourth of the five links. In this example, as in the master-slave example-above, it will be assumed that the drill process should only commence and continue after the mill process is complete and while the mill remains parked in a returned position.

Peer-to-peer systems overcome the problems associated with master-slave systems. In the example above the mill controller can be programmed to itself send a "mill parked" signal to the drill controller to, in effect, control the drill controller and start the drill process. Thus, in the peer-to-peer system the intermediate communication with a master controller is eliminated.

In addition, peer-to-peer systems are extremely flexible in that additional processing hardware can easily be added to the system to support additional tools added to the network of controlled machinery.

Moreover, because there is no master controller in a peer-to-peer network, typically peer-to-peer networks do not have to be completely shut down when one controller becomes inoperable. Referring again to the example above, a second drilling process that is completely unrelated to the aforementioned milling and drilling process could continue despite an inoperable mill controller.

Unfortunately, while peer-to-peer systems overcome most of the shortcomings associated with master-slave systems, peer-to-peer systems do not have well defined fault conditions and therefore, when a controller becomes inoperable, other controllers and associated tools can become uncontrolled or uncontrollable and unsafe. Referring again to the preceding example, where the drilling process must follow a successful milling process and the milling tool must remain parked during the drilling process, after the mill returned signal is sent from the mill controller to the drill controller, the drilling process can begin. If, however, during the drilling process the mill controller becomes unable to communicate with the drill controller, the mill controller might begin a subsequent milling process while the drilling process is occurring. Clearly, in this scenario it would be likely that the mill and drill tools would crash.

In another scenario, where the hand held controller is disconnected from the network and the stationary controller is used to begin a drilling cycle, if the stationary controller is somehow rendered inoperable there would be no way to stop the drilling cycle or force the drill controller into safe fault operation. If a human operator were in the path of the drill spindle, the operator could be severely injured.

In a peer-to-peer network one solution to the safety problem would be to simply force all controllers into fault operation when any one network controller becomes inoperable. This solution, however, eliminates one of the advantages that the peer-to-peer system has over the master-slave system, that is, that some controllers can operate despite a single controller being inoperable.

Another solution would be to provide a redundant stationary controller that could control all network controllers in emergency situations. In this case, when one controller becomes inoperable, the redundant controller could be used to determine if control of operable controllers is dependent on the status of tools associated with the inoperable controller and should therefore be forced into safe fault operation. This solution, although providing a higher degree of safe operation is not fail-safe in that, if the redundant controller where to become inoperable, the entire network would have to be forced into fault operation to ensure safe control.

Thus, it would be advantageous to have a control scheme that provides all of the advantages associated with a peer-to-peer network including flexibility and the ability for operable controllers to continue control of associated tools despite inoperable controllers in a network, while at the same time providing safe network control.

SUMMARY OF THE INVENTION

The present invention includes a method for controlling a plurality of peer-to-peer controllers in a control network. According to the present invention, during network operation each individual controller keeps track of other controllers that have controlled it, forming a control list of controllers that have previously controlled the individual controller. As operation progresses, additional controlling controllers are added to the list and the individual controller monitors controllers on its list to determine if any one of the controllers on the list becomes inoperable for any reason. For the purposes of this explanation the term inoperable is used to refer to a state wherein a controller can no longer control the individual controller during a network cycle.

When a controller on an individual controller's control list can no longer control the individual controller, the individual controller clears the non-communicating controller from its control list and forces machinery associated therewith into fault operation. In one case, fault operation may cause the machinery controlled by the individual controller to park itself in a storage position. In another case fault operation may cause the machinery to complete its current cycle and then park. In yet another case fault operation may completely halt machinery movement.

One object of the invention is to provide a peer-to-peer control network that is safe. When a controller which has previously controlled an individual controller becomes inoperable, the inoperable controller may be the only way to stop movement of machinery associated with the individual controller and therefore, control would be lost. By forcing the individual controller into fault operation control is maintained.

Another object of the invention is to provide a control network that is flexible. Because the present network is a peer-to-peer network, the network allows an operator to add additional controllers and associated machinery so that the network can be expanded and contracted to meet the various needs of a control environment.

Yet another object of the invention is to provide a network wherein operable controllers can remain operational despite one or more inoperable controllers. The peer-to-peer configuration in the present case means that there is no central master computer that controls all other controllers. In fact, in peer-to-peer networks each controller may be a slave to (i.e. may be controlled by) all other controllers or may be a master to (i.e. may control) all other controllers and, even when a controller that has previously controlled the individual controller becomes inoperable, after the individual controller assumes fault operation according to the present invention, the individual controller can resume normal operation when control signals are received by another operational controller. Thus, while control of some individual controllers may be interrupted for a short time, when one controller becomes inoperable, many controllers may remain operational throughout and, even controllers that are forced into fault operation may resume normal operation shortly under control of other controllers.

The inventive method is to be used with a peer-to-peer control network including a plurality of active stations that can communicate via a network bus wherein at least one of the stations can be controlled by at least two other stations. A station that has controlled another station is a controlling station. The method is used to maintain network control when a controlling station becomes a non-communicating station. A non-communicating station is a station that cannot communicate with other network stations. The method comprises the steps of, for each individual active station that can be controlled by at least two other stations, monitoring network signals to determine when another station controls the individual station, generating a control list including controlling stations that have controlled the individual station, monitoring the network to determine when one of the control list stations becomes a non-communicating station and, when a non-communicating control list station is identified, clearing the control list and setting control of the individual station to a default state.

The invention also includes a controller to be used with the inventive method wherein each station includes a controller and each individual controller includes a memory for storing a control list including controlling controllers that are or have controlled the individual controller, a processor receiving network signals and determining when a controlling controller controls the individual controller, a list keeper for generating the control list, an identifier to determine when one of the control list controllers becomes a non-communicating controller and a list clearer that, when a non-communicating controller is identified, clears the non-communicating controller from the control list and sets control of the individual controller to a default state.

Other and further objects and advantages of the present invention will become apparent during the course of the following description and by reference to the accompanying drawings.

BRIEF DESCRIPTION OF THE DRAWINGS

FIGS. 3a, 3b, 4a, 4b and 5a, 5bare diagrams depicting controller active and control lists according to the present invention;

FIG. 6 is a block diagram of a controller according to the present invention;

DETAILED DESCRIPTION OF THE INVENTION

Exemplary Industrial Process

Figure 1:
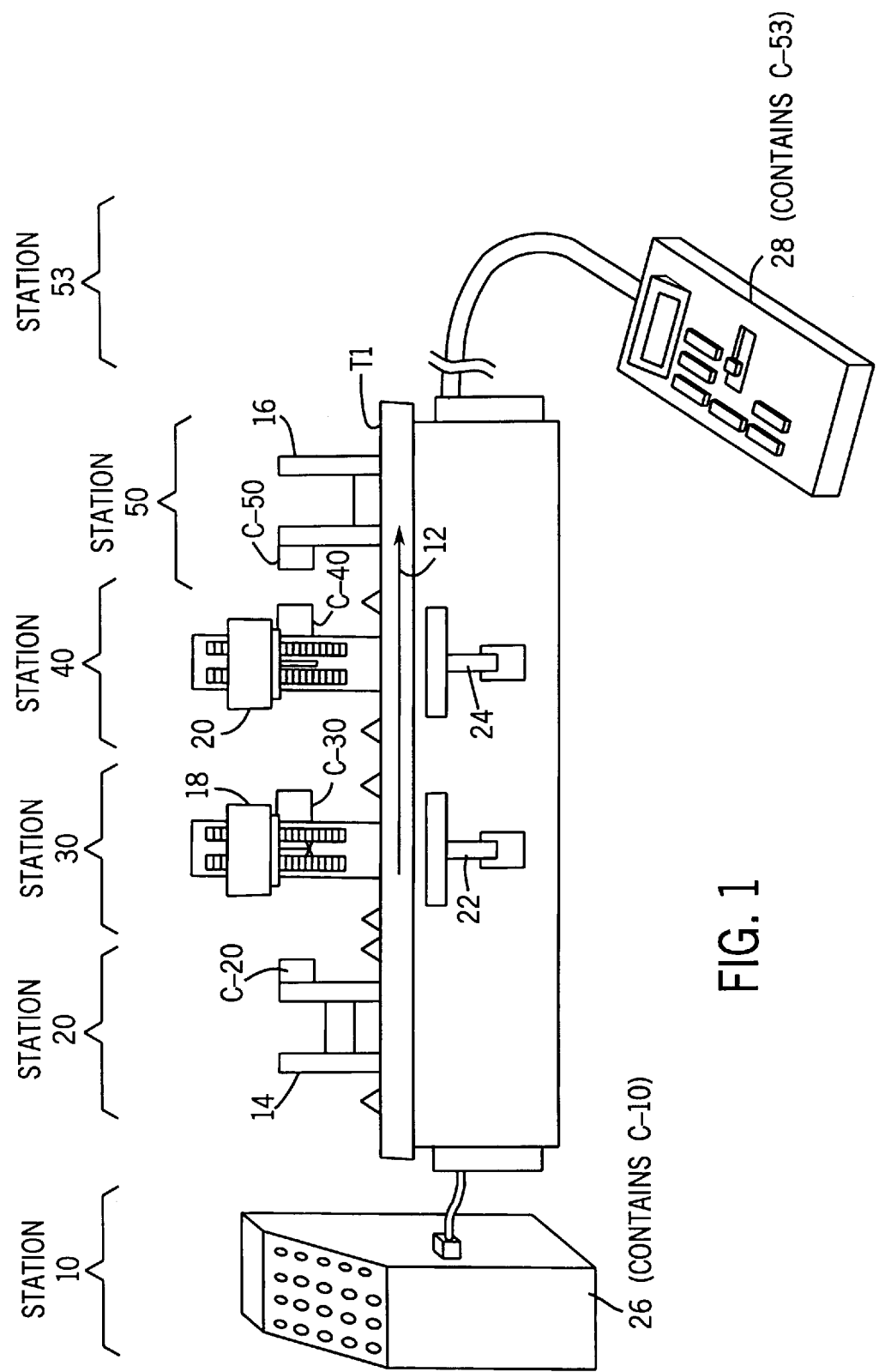
FIG. 1 is a diagram of an industrial machine that is operated by a plurality of peer-to-peer controllers according to the present invention.

The present invention will be described in a context of an exemplary machine 10 shown in FIG. 1. The machine 10 includes a single indexer in the form of a transfer bar T1 which moves work pieces (not shown) along its length in the direction of arrow 12. The machine 10 also includes a number of tools located at four different stations 20, 30, 40 and 50, respectively, which alter work piece orientation or perform some type of metal removing process on work pieces when present at an associated station. To accommodate the metal removing process, the transfer bar T1 moves work pieces in a step-wise fashion, from station to station, the work pieces being held in position during metal removing periods and moved during transfer periods.

Station 20 includes a loader 14 which feeds work items to a first end of the transfer bar T1. Station 50 includes an unloader 16 which removes work items from a second end of the transfer bar T1. Tools at stations 30 and 40 perform metal removing processes. Station 30 includes a vertical mill 18 and a vertical drill 20, respectively. Because work items have a tendency to move during machining processes, two clamps 22 and 24 are provided, one at each of the two metal removing stations 30 and 40. Prior to a machining period, each clamp 22 or 24 automatically clamps a work item at an associated station in a position aligned with station tools for metal removal.

Referring still to FIG. 1, two other stations 10 and 53 are provided which allow interface controllers to be connected to the machine 10 for three main purposes. First, an interface controller allows the user to switch from automatic to manual operation or to locally turn off a section of the machine. Thus the interface controller allows the user to select different modes (e.g. automatic or manual) of operation.

Second, when a manual mode of operation is chosen, an interface controller provides buttons and switches which are used in manual machine operation. Manual controls are typically push-buttons that facilitate local control cycle movements. For example, referring still to FIG. 1, manual push-buttons could be used to drill 20 downwardly from a returned position to an advanced position and then back up to the returned position to test for proper operation and movement of the drill or to use the drill in a manual drilling operation.

Third, during manual operation of tool, indicators are often required to help a user identify tool positions (e.g. advanced, intermediate or returned positions). Thus, a control panel will often provide indicator lights to facilitate observation. For example, referring still to FIG. 1, when the drill 20 is in manual mode, a light may be required for indicating when the drill is in the advanced position or when it is in the returned position.

In FIG. 1, a stationary control panel 26 is provided at station 10 and a hand-held programming device (HHD) 28 is provided at station 53. The HHD 28 can easily be connected and disconnected to the machine 10. Each of the control panel 26 and HHD 28 include interface controllers (not shown) for programming, control and observation purposes.

Local Area Token Rotation Network

Referring still to FIG. 1, a separate controller C-20, C-30, C-40 and C-50 is provided at each of the tool stations 20, 30, 40 and 50 for controlling associated tools. In addition to controlling the mill 18 and drill 20 at stations 30 and 40, controllers C-30 and C-40 also control associated clamps 22 and 24, respectively. The interface controllers associated with the control panel 26 and the HHD 28 will be referred to as panel controller C-10 and HHD controller C-53, respectively. While the transfer bar T1 could have its own controller, in the interest of simplifying this explanation it will be assumed that the transfer bar T1 is controlled by controller C-10. It will also be assumed that the tool controllers C-20, C-30, C-40 and C-50 are only capable of polling other controllers for status information or controlling their own tools.

In a manual mode of operation each of the control panel 26 and HHD 28 can be used to control any of the tools 14, 16, 18 or 20, to poll the tools for diagnostic information, or to alter tool operation.

The local area network in the present example is comprised of all of the controllers connected to machine 10 which configure themselves into a logical ring so that a token may be rotated around the ring from controller to controller. Only the controller currently holding the token may transmit a message on the network. This logical ring configuration is implemented by assigning each controller a unique controller number, or address, and rotating the token in ascending address order. These same controller addresses are employed to identify the source and destination of messages transmitted on the network.

Figure 2A:
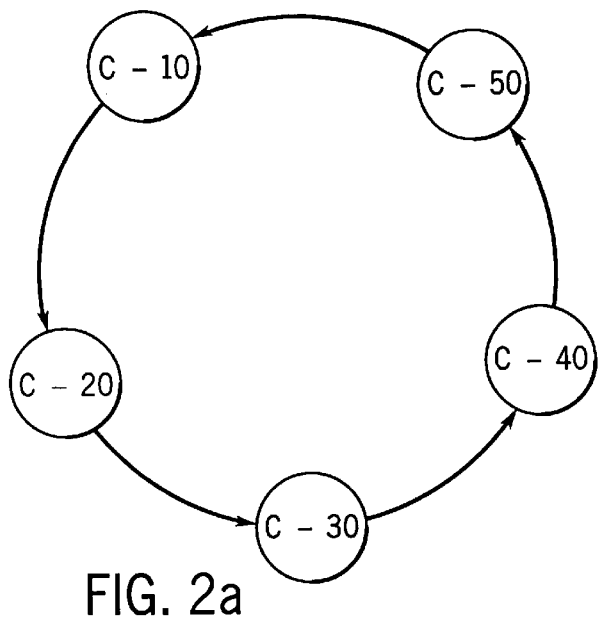
FIGS. 2a, 2b and 2c are schematic representations of the logical ring formed by the network of FIG. 1 showing the addition and removal of a station from the logical ring.

Initially, it will be assumed that the HHD 28 is disconnected from the machine 10. Referring particularly to FIG. 2a, each of the panel controller C-10 and tool controllers C-20, C-30, C-40 and C-50 is represented by a circular icon with a like numerical controller number or address. Thus, controller C-10 is labeled C-10, controller C-20 is labeled C-20 and so on. At any moment in time, one of the controllers C-10, C-20, C-30, C-40 and C-50 is allowed to send a message on the network to the other controllers and the sending controller is said to possess the "token". If the message sent requires an immediate response from a designated controller, the designated controller is given the opportunity to respond. The right to send then passes back to the controller holding the token. The token holder must follow certain rules that regulate the amount of time that it may hold the token. When this time expires, or when the controller has nothing further to send, the token holder may perform some network maintenance operations. When maintenance operations are complete, the token holder passes the token to the next, or "successor", controller in the logical ring. From the time the controller passes the token until it again receives the token, the controller will receive messages from other controllers on the network who posses the token.

The token is rotated to a successor controller with a token message that includes the controller number of the successor controller that is to receive it. This, of course, presumes that each controller stores the controller number of its successor. For example, in the network of FIG. 2*a*, controller C-10 stores a successor address C-20, the controller C-20 stores a successor address C-30, and so on around the ring. The resulting circulation of the token is smooth and predictable as long as all controllers remain in the logical ring and no new controllers want in the ring.

Figure 2B:
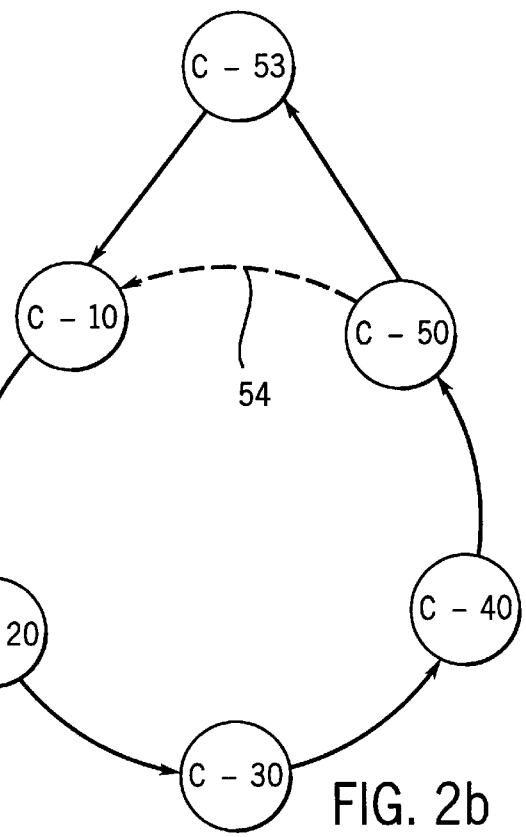

FIG. 2*b* illustrates the situation in which another controller C-53 is added to the ring. As indicated by the dashed line 54, the token is no longer rotated from controller C-50 to controller C-10, but is instead passed to the new controller C-53.

One way to account for new controllers in the ring is to employ a second virtual token, called a "solicit token," which is passed around the logical ring. When a controller holds the solicit token, it may send a SOLICIT message as part of its network maintenance operations. Such a message includes the address of its successor controller, and it is directed to a single controller number located numerically between itself and its successor controller.

Referring also to FIG. 1, when the HHD 28 is plugged into station 53, the HHD controller C-53 "wants into" the token passing network and will respond to one of the SOLICIT messages. The HHD controller responds with a SET SUCCESSOR message which informs the token holder of the new ring member. For example, controller C-50 sends a series of SOLICIT messages with destination addresses between C-50 and the address of its successor station C-10. In this case, assuming a maximum controller address of C-55, after soliciting address C-55 controller C-50 would wrap around and solicit a first controller address C-1.

The new controller C-53 has an address between fifty and ten and so it responds to one of these SOLICIT messages with the SET SUCCESSOR message. As a result, the successor for controller C-50 is changed to C-53, the successor for new controller C-53 is set to C-10, and the token is passed to the new controller C-53 in the normal fashion. A smooth transition is thus achieved.

The solicit token is passed around the logical ring at a much slower rate than the "master" token. In the preferred embodiment there is no overt act of passing the solicit token. Instead, each controller is programmed such that if it does not hear a SOLICIT message on the network during one complete revolution of the master token, it assumes it has the solicit token and should send the SOLICIT message itself. As a result, a SOLICIT message is sent once for each complete revolution of the token in the ring.

Another way to account for a new controller in the network ring is to enable each active controller to perform a linear search of other possible controller addresses between the polling controller and the next active controller in the network ring at a rate of one address for each token rotation. It takes several token rotations or network cycles to completely search the addresses between two active controllers. For example, referring again to FIG. 2*b*, during a first network cycle rotation, controller C-50 would poll address C-51, determine there is no controller there and then pass the token to the next active controller C-10. During the next network cycle rotation, controller C-50 would poll address C-52 and so on until address C-53 is polled and controller C-53 is added to the network ring. Thus, in this case each active controller is responsible for searching addresses between its own address and the address of its successor controller for new controllers.

Figure 2C:
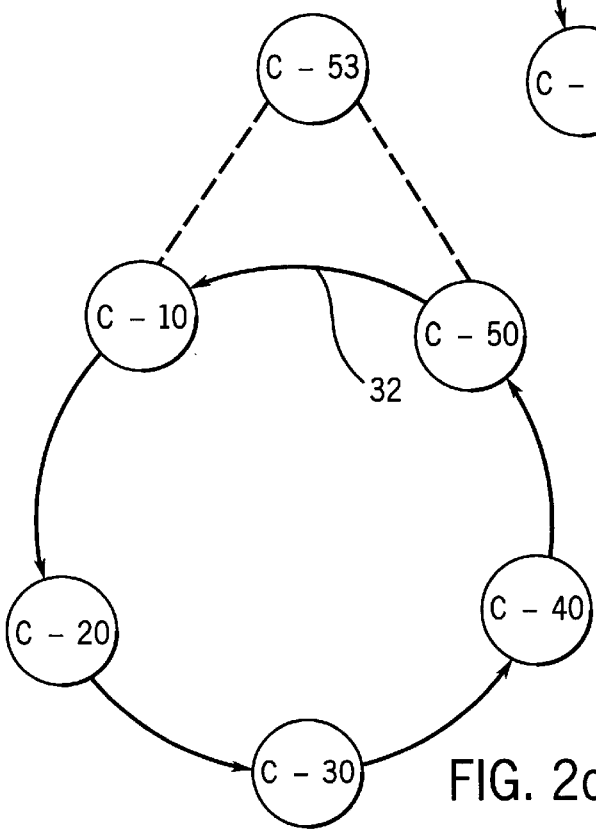

The logical ring may also be changed when a station becomes inactive. If a specific network controller becomes inactive or unable to communicate with other network controllers either because the specific controller has been purposefully disconnected from the network or has accidentally been removed from the network, the token must be rotated directly from the token holding controller to the next active controller. For example, referring again to FIG. 1 and also to FIG. 2*c*, if the HHD 28 is disconnected from station 53, controller C-53 is unable to communicate with the network. In this case, when controller C-50 attempts to rotate the token to controller C-53, controller C-53 does not accept the token. At that point, controller C-50 rotates the token to the next active controller, in this case, controller C-10.

Referring also to FIG. 3*a*, one way to enable a smooth transition between controllers when one controller becomes inactive is to provide each controller with a memory wherein an active list 34 including entries for each of the active network controllers. Thus, at a time τ1 corresponding to FIG. 2*b*, the active list 34 for each controller would include entries for controllers C-10, C-20, C-30, C-40, C-50 and C-53. Similarly, as illustrated in FIG. 5*a*, after controller C-53 becomes inoperable, the active list 34 for each controller at a time τ3 corresponding to FIG. 2*c* would include entries for controllers C-10, C-20, C-30, C-40 and C-50.

For the purpose of simplifying this explanation, list building and list maintenance will only be described with respect to one of the drill controller C-40. However, it should be understood that all of the controllers having active lists which are associated with the present invention operate in the same manner.

To maintain its active list 34, the drill controller C-40 monitors the network during each network cycle to identify controllers that accept the token during each cycle. Thus, when the network of FIG. 1 is initially powered up, during the first cycle, controller C-40 identifies controllers C-10, C-20, C-30, C-40 and C-50 as active controllers by identifying those controllers as token accepting controllers. When a new controller accepts the token (i.e. controller C-53 in FIG. 2*b*) the new controller is added to the list. In a similar fashion, when a network controller becomes inactive and does not accept the token, the inactive controller is deleted from the active list.

With a complete active list, when one controller does not accept the token from a token holding controller, the token holding controller simply attempts to pass the token to the next controller on its active list. If the next controller accepts the token, network control continues with the next controller controlling the network. However, if the next controller on the active list does not accept the token, the token holding controller goes to the following controller on the active list and so forth.

In the alternative, some peer-to-peer controllers may not maintain an active lists 34. In networks where controllers do not maintain active lists, when a successor controller does not accept the token, the token holding controller simply begins sending token passing messages to the next consecutively numbered controller addresses until a successor controller responds. The responding controller then simply takes the token and the passing controller stores the address of the responding controller as the next network controller in the ring. For example, in FIG. 2c where controller C-53 is removed from the ring, controller C-53 would not accept the token from controller C-50. At that point, controller C-50 would attempt to rotate the token to controller C-54, then to controller C-55, and so forth. At a maximum controller address, for example, controller address C-55, controller C-50 would cycle back to the first possible controller address C-1 and attempt to pass the token. Controller C-50 continues to attempt to pass the token to ascending addresses until controller C-10 accepts the token. At that point controller C-50 would store controller C-10 as the next controller address for future purposes.

Multiple Controller Tools Control

In most peer-to-peer token passing networks, many different controllers can control various machine tools. For example, in FIG. 1 the panel controller C-10 at station 10 can be used to control the drill controller C-40 at station 40 in the manual operating mode. When the HHD 28 is connected at station 53, the HHD 28 can also be used to control drill 20 operation. In addition, drill controller operation may depend on control messages received from other tool controllers indicating tool status of the loader 14, unloader 16 or the mill 18.

Moreover, during automatic operation, the panel controller C-10 may also be able to control the drill controller C-40 as a function of transfer bar T1 position. Prior to the transfer bar T1 being moved, the drill 20 should be parked in a returned position. With the drill 20 parked, the bar T1 moves work items from station 30 to station 40. When an item reaches station 40 the bar T1 stops and controller C-10 can send a message to the drill controller C-40 to clamp the item at station 40 and thereafter start the drilling process.

Unfortunately, multiple controller control can cause safety problems when one or more controllers become inoperable. A problem can arise when a controller that is used to control another controller causes tools associated with the controlled controller to begin movement and then the controlling controller becomes unable to maintain control of the tool. For example, where the HHD 28 is used to start drill 20 movements downward toward bar T1 and then the HHD is unintentionally disconnected from machine 10, there may be no timely way to stop the drill 20 from continuing its descent toward bar T1. Even if control panel 26 were capable of stopping the drill's descent, in many cases the control panel 26 may be located in a remote area that cannot be accessed in time to stop the drill from completing its downward stroke. Clearly, this type of system could prove to be extremely dangerous as a machine operator might be within the path of the descending drill or a work item might be improperly located below the drill spindle causing the drill 20 and item to crash.

Controller Hardware And Fault Recognition

The present invention provides a method whereby network control can be maintained even when one or more peer-to-peer network controllers become inoperable or are rendered incapable of communicating with other controllers.

To this end, referring to FIG. 6, in addition to other components, each controller according to the present invention includes hardware that provides a processor 38, a list keeper 42, memory 44, an identifier 46, a list clearer 48 and a plurality of buses that connect the other components.

Once again, in order to simplify this explanation the inventive method will only be described in the context of the drill controller C-40. However, it should be understood that the method is used with all of the peer-to-peer network controllers. The drill controller processor 38 receives messages from the network 52 and determines which network controller sent the messages, and determines if the messages are control messages or some other type of messages. Among other types, messages that are not control messages (e.g. messages requiring tool movement), may be diagnostic request messages requiring an update of the current position of associated tools or reconfiguration messages used to alter operation of tools. In addition the processor 38 determines if the received message indicates a successful token pass or an unsuccessful token pass from one network controller to another.

The processor 38 provides information to the list keeper 42 via bus 56 indicating the sender controller number SC, if the received message designated the receiving controller and, if the received message does designate the receiving controller, indicates if the received message is a control signal.

1. Controllers that maintain Active Lists

Referring to FIGS. 3a, 3b and 6, in one embodiment the memory 44 includes two separate lists of controllers. The first list as illustrated in FIG. 3a and described above is the active list 34. The second list illustrated in FIG. 3b is a control list 58. The list keeper 42 updates both the active list 34 and the control list 58 via bus 65.

In the case of the drill controller C-40, control list 58 includes a separate entry for each network controller that has controlled the drill controller C-40 during machine operation since the last time the control list 58 was cleared. Thus, referring also to FIG. 1, if the drill controller C-40 has been controlled by both the panel controller C-10 and the HHD controller C-53, the control list 58 for the drill controller C-40 will include entries for both controllers C-10 and C-53 (See FIG. 4b).

The identifier 46 receives sender controller SC information from the processor 38 via bus 60 identifying the controller that sent the most recent message via the network 52. The identifier is also linked to the memory via bus 62 for receiving a current version of the active list 34 and a current version of the control list 58. The identifier compares the sender controller number SC to controller addresses on both the active list 34 and the control list 58 to determine when either a new controller has become active or when a previously active controller has become inactive. Thus, where the sender controller number SC is less than the next controller address on the active list, a new sender controller has been added to the active list. When a new active controller is identified the identifier 46 communicates with the list keeper 42 via bus 64 indicating that the new active controller address should be added to the active list 34.

However, where a token pass attempt is unsuccessful, an inactive controller or at least a network address that does not correspond to an active controller has been identified. At this point the identifier 46 communicates with the list keeper 42 via bus 64 indicating that if the identified address corresponds to a previously active controller, the previously active controller should be removed from the active list 34.

In addition, when an inactive controller is identified, the identifier 46 compares the inactive controller to the control list 58 to determine if the inactive controller is on the control list 58. If the inactive controller is on the control list 58 it is possible that tools associated with the controller, in the present example, the drill 20 associated with the drill controller C-40, are out of control. In this case, the identifier 46 provides a signal to the list clearer 48 via bus 66 indicating that the drill 20 should be forced into safe fault operation. Most likely, with a drill, 20 safe fault operation would either completely turn off the drill stopping downward or upward movement and spindle rotation or stopping spindle rotation and returning the drill to a parked position. In addition to forcing safe fault operation, when a signal is received via bus 66, the list clearer 48 also instructs the list keeper 42 to clear the inactive controller address from the control list 58 in memory 44.

After fault operation commences and the inactive controller is cleared from the control list 58, the drill controller C-40 can again provide the drilling process if instructed to by some other controller via a control message.

Figure 7:
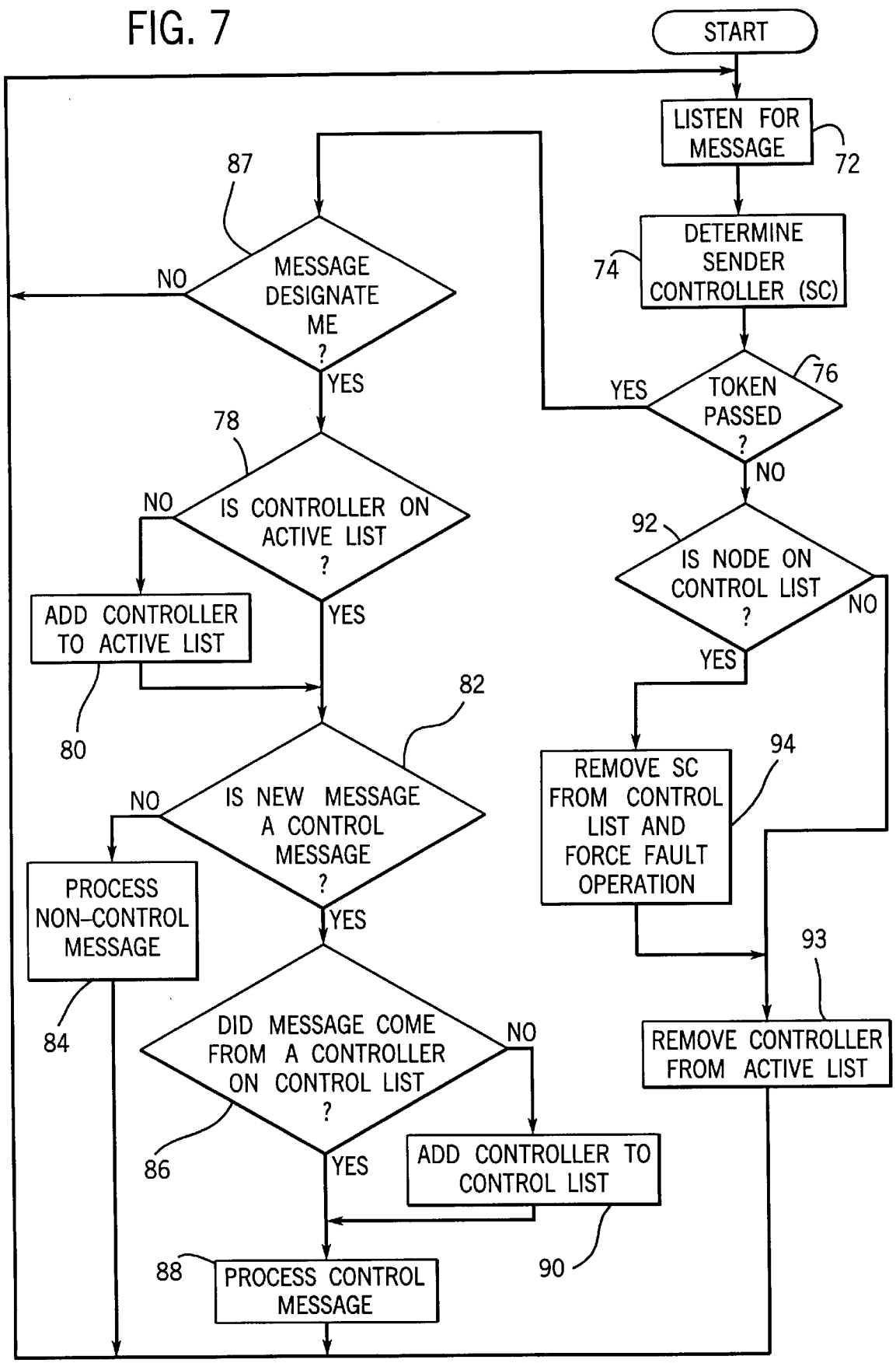
FIG. 7 is a flow chart depicting operation of a controller according to the present invention.

Referring now to FIG. 7, a flow chart depicting operation of the inventive controller and method wherein the controller maintains an active list 34 is illustrated. Referring also to FIGS. 1, 2b, 3a, 3b and 6, it will be assumed that after a few cycles of operation controllers C-10, C-20, C-30, C-40, C-50 and C-53 are all active. The drill controller C-40 active list 34 includes six entries, a separate entry corresponding to each of the separate active controllers. It will also be assumed that at time τ1 the drill controller C-40 has not been controlled by any other network controllers. Therefore, as in FIG. 3b, initially the control list 58 is empty.

Starting at process block 72, the processor 38 listens for token acceptance messages on the network. When a message is received, at block 74 the processor 34 first determines which network controller corresponds to the sending or sender controller number or address SC that sent the message. Next, at block 76 the processor 38 determines if the message indicates a successful token pass from one controller to another at decision block 76.

Where a token has been successfully passed, control passes to decision block 87 where the processor 38 determines if the message designates the drill controller C-40. Where the message does not designate the drill controller C-40 control passes back up to block 72 where the processor 38 again listens for the next network message. Where the received message does designate the drill controller C-40 control passes to block 78 where the identifier 46 determines if the sender controller number SC is on the drill controller's active list 34. Where the sender controller number SC is not on the active list 34 the identifier 46 causes the list keeper 42 to add the sender controller number SC to the active list 34 at block 80 Where the sender controller number SC is already on the active list 34 or after the controller number has been added to the active list 34, the identifier 46 next determines at decision block 82 if the received message is a control message.

If the received message is not a control message, the individual drill controller C-40 simply processes the non-control message at block 84. However, if the received message is a control message, at decision block 86 the identifier 46 determines if the message came from a controller on the drill controllers control list 58. If the message sending controller is on the control list 58, the drill controller C-40 simply processes the control message at block 88. If the message sending controller is not on the control list 58, at block 90 the sender controller number is added to the control list at block 91 and the control message is processed.

Referring still to FIG. 7, and specifically to block 76, where a token passing attempt is unsuccessful, processor control passes to decision block 92 where the identifier 46 determines if the sender controller number SC is on the drill controller's control list 58. Where the sender controller number SC is not on the drill controller's control list 58 the identifier 46 removes the sender controller number SC from the active list 34 at block 93. Where the sender controller number SC is on the drill controller's control list 58 the identifier signals the list clearer 48 via bus 66.

When the list clearer 48 receives a signal on bus 66 the clearer 48 causes the list keeper 42 to update the control list 50 in memory 44 by deleting the sender controller number SC from the control list 58 at block 94. Then, the identifier 46 causes the list keeper 42 to update the active list 34 by deleting the sender controller number SC from the active list 34 at block 93. After blocks 84, 88, and 93 control reverts back to block 72 where the processor 38 listens for other network messages.

As an example of how the inventive controllers work, referring again to FIG. 2b, it will be assumed that during operation the loader controller C-20 becomes inactive for some reason. In this case, the drill controller C-40 listening for messages on the network would hear messages from the control panel controller C-10. When controller C-10 has completed its operations it will first attempt to pass a token to one of the controller addresses between its address and the address of the next known active controller address, in this case controller address C-20. For example, controller C-10 may attempt to pass the token to controller address C-11. Because there is no controller at address C-11 in the example, at block 76 the processor 38 would determine that the token pass attempt was unsuccessful and control would pass to block 92. Controller address C-11 is not in the drill controller's control list (see FIG. 3b) and thus, control passes through block 93 and back up to block 72 where the processor 38 continues to listen for additional messages.

Where controller C-20 is also inactive, the process described above with respect to inactive controller address C-11 would be repeated with respect to controller C-20 with control passing through blocks 72, 74, 76, 92, and 93 prior to returning to block 72.

Thereafter, controller C-10 would attempt to pass the token to the next known active controller at address C-30. Assuming controller C-30 is still active, at block 76 control would pass to block 78 and down the left hand leg of FIG. 7 adding the sender controller number to the active list 34 and control list 58 when appropriate and processing the received messages. Thus where an active controller becomes inactive, if the inactive controller is not on the control list 58 for the drill controller C-40, the drill controller C-40 will remain active and continue normal operation (i.e. will not be forced into fault operation).

However, assuming the control list 58 of FIG. 4b is generated after a few network cycles, if either controller C-10 or C-53 were to be come inactive, the drill controller C-40 would force the drill 20 into fault operation. For example, referring to FIGS. 2c and 5a, assuming controller C-50 holds the network token, when controller C-50 attempts to pass the token to controller C-53, if controller C-53 is inactive, controller C-53 will not accept the token.

Here, control passes from block 76 to block 92 where the identifier 46 determines that the sender controller number SC, in this case number C-53, is in the drill controller's control list 58 as seen in FIG. 4b. Because controller C-53 did not accept the token it is presumed that controller C-53 is inactive. In the present example, because controller C-53 has previously controlled the drill 20 via the drill controller C-40, the drill controller C-40 may be uncontrolled. Thus, at block 94 the identifier 46 signals the list clearer 48 which in turn causes the list keeper 42 to delete the sender controller number SC (i.e. C-53) from the control list 58 as indicated in FIG. 5b and forces the drill controller C-40 to assume fault operation via a signal on line 73.

Next, controller C-50 attempts to pass the token to the next active controller C-10 which, if still active, accepts the token, an act recognized by the processor 38 at block 76.

Thus, at this point, referring to FIGS. 5a and 5b, the active list includes only controllers C-10, C-20, C-30, C-40 and C-50 and the control list 58 still includes active controller C-10 (i.e. only controller C-53 is deleted from the control list 58).

2. Controllers that do not maintain Active Lists

Figure 8:
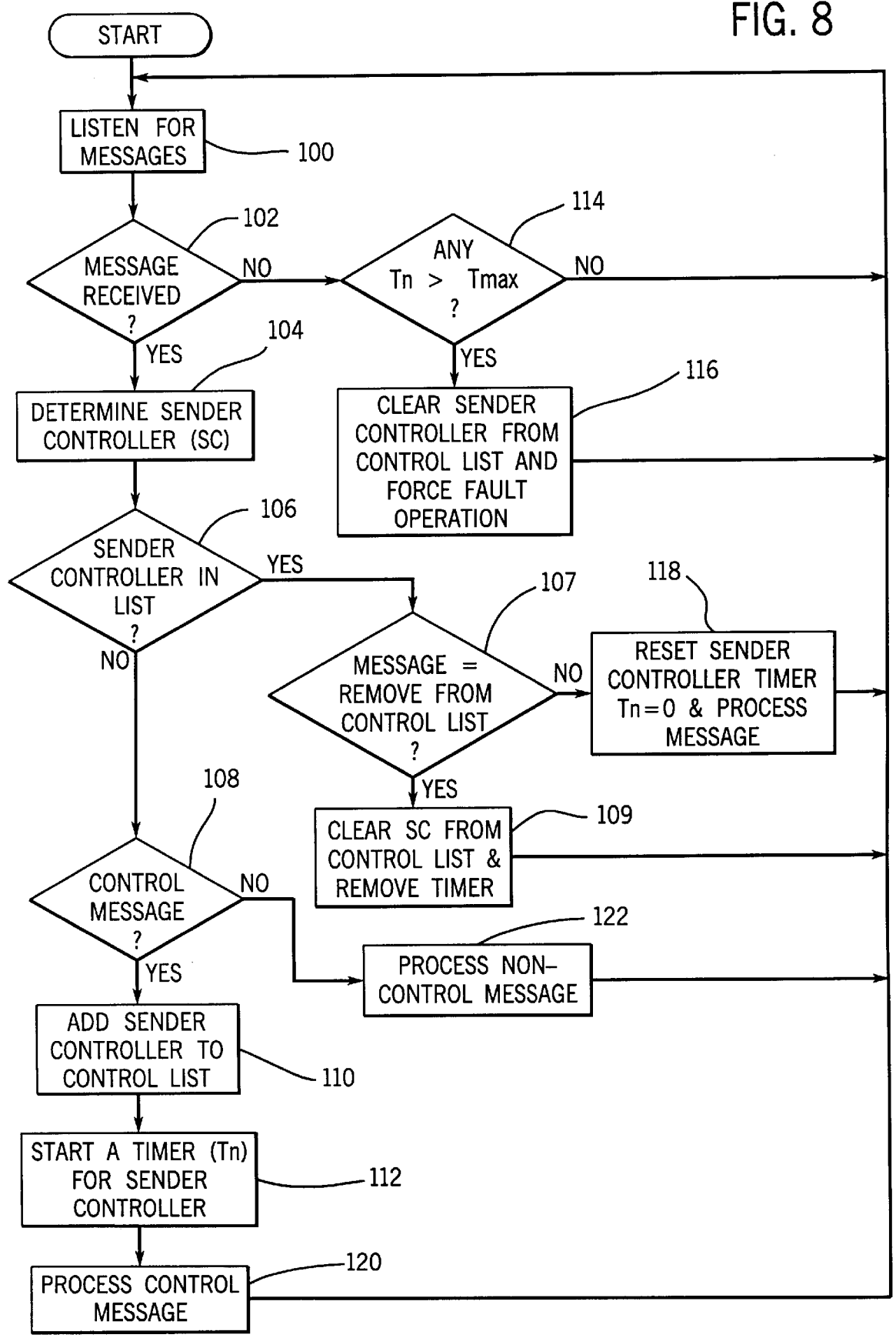
FIG. 8 is a flow chart similar to FIG. 7.

In a second embodiment, where an active list of controllers is not kept by each network controller, for the purposes of the present invention the controller components would be identical to those in FIG. 6 but their functions would be slightly different. Referring also to FIG. 8, control would begin at block 100 where the processor 38 listens for messages on the network 52. When a message is received at block 102, at block 104 the processor 38 determines the sender controller number (SC). Next, at block 106 the identifier 46 determines if the sender controller number is in a control list 58. Where the sender controller number is not already in the control list, at block 108 the processor 38 determines if the message that was received is a control message. Where the message received is a control message, at block 110 the sender controller number SC is added to the control list 58 and a timer $T_n$ which corresponds to the sender controller number SC is started at block 112. Then the control message is processed at block 120. Over time, as with the previous embodiment, a control list 58 of controllers that have controlled the drill controller C-40 is constructed. In the present example, the control list 58 will eventually include controllers C-10 and C-53 and therefore, two timers, $T_{SC10}$ and $T_{SC53}$ will be independently tracking the time period since the last message from their associated controller numbers C-10 and C-53, respectively.

Referring still to FIG. 8, at decision block 102, where no message is received, control passes to decision block 114 where each of the timers $T_{SC10}$ and $T_{SC53}$ for each of the controllers C-10 and C-53 in the control list 58 is compared to a maximum time period $T_{max}$. The maximum time period Tax is a time within which an active controller will provide some type of signal to the network (e.g. a heartbeat signal or a receive token signal . . . ). Where none of the timer periods is greater than the maximum period $T_{max}$ control passes back to block 100 where the processor 38 continues to listen for messages on the network. However, where any one of the controller timer periods $T_n$ is greater than the maximum period $T_{max}$, it is assumed that the controller associated with the timer has become inactive.

Because the timer periods $T_n$ are only associated with control list controllers, when one of the timer periods $T_n$ exceeds the maximum period $T_{max}$, control is lost. Therefore, at block 116 the drill controller C-40 is forced into fault operation and the sender controller number SC is deleted from the drill controller's control list 58.

Referring again to decision block 106, where a message is received and the sender controller number SC is in the control list, control passes to block 107 where the identifier 46 determines if the received message indicates that the sender controller is being purposefully taken out of the control ring. In the present example, the HHD controller C-53 may be purposefully detached from the network. Where a controller message indicates purposeful removal, control passes to block 109 where the sender controller is removed from the control list 58 and the timer associated with the sender controller is deleted. Where the message is not a purposeful removal, control passes to block 118 where the timer $T_n$ associated with the sender controller number is reset to zero and the received message is processed.

Referring again to decision block 108, where the message that is received is not a control message control passes to block 122 where the non-control message is processed. After blocks 114, 116, 118, 109, 122 and 120 control passes back up to block 100 where the processor 38 continues to listen for other network messages.

This concludes the detailed description of the invention. However, it should be appreciated by those of ordinary skill in the art that the description herein is given only by way of example and that various modifications and additions might be made while still coming within the scope of the invention. In particular, even where a controller already provides an active controller list, the method depicted in FIG. 8 could also be used to determine when network control is lost. The important aspect of the inventive method is simply that a control list including controllers that have controlled an individual controller is kept by the individual controller and when one of the control list controllers becomes inactive the individual controller is forced into fault operation and its control list is cleared. In addition, instead of simply deleting an inactive controller from the control list when the inactive controller is identified, the entire control list might be cleared and then rebuilt as other control continues. Moreover, there are other orders in which the control list and the active list may be generated, maintained and compared, all of which are contemplated by this invention.

In order to apprise the public of the scope of this invention, the following claims are made.

We claim:

1. A method to be used with a peer-to-peer control network including a plurality of active controllers that can communicate via a network bus wherein at least one of the controllers can be controlled by at least two other controllers, a controller that has controlled another controller being a controlling controller, the method used to maintain network control when a controlling controller becomes a non-communicating controller, a non-communicating controller being a controller that cannot communicate with other network controllers, the method comprising the steps of, for each individual active controller that can be controlled by at least two other controllers:

a) monitoring network signals to determine when another controller controls the individual controller;

b) generating a control list including controlling controllers that have controlled the individual controller;

c) monitoring the network to determine when one of the control list controllers becomes a non-communicating controller;

d) when a non-communicating control list controller is identified, clearing the non-communicating controller from the control list and setting control of the individual controller to a default state; and e) repeating steps a through d.

2. The method of claim 1 wherein the step of monitoring network signals includes the steps of, receiving network signals and determining if the network signals are control signals for controlling the individual controller.

3. The method of claim 1 wherein the step of generating a control list includes the steps of, each time a controller controls the individual controller, determining if the controlling controller is present in the control list, when the controlling controller is present in the control list, skipping to step c, and, if the controlling controller is not present in the control list, adding the controlling controller to the control list to generate an updated control list.

4. The method of claim 1 wherein the peer-to-peer network is a token passing network where active controllers communicate via the network bus in an ordered sequence, each active controller operating for some portion of a network cycle and, wherein, the step of monitoring the network includes the step of determining when, during a network cycle, one of the control list controllers has not been operational.

5. The method of claim 4 wherein the step of determining when one of the control list controllers has not been operational includes the steps of determining when a controller that operated during a previous network cycle fails to communicate when it is supposed to in the ordered sequence of a current network cycle, the failed controller being a non-communicating controller, and, when a non-communicating controller is identified, determining if the non-communicating controller is in the control list.

6. The method of claim 1 wherein the step of monitoring the network to determine when one of the control list controllers becomes a non-communicating controller includes the step of determining when a control list controller fails to provide a signal to the network for a predetermined timer period.

7. The method of claim 6 wherein step of determining when a control list controller fails to provide a signal to the network includes the step of determining when a control list controller fails to provide a signal for the predetermined timer period to the network designating the individual controller as the recipient of the signal.

8. The method of claim 1 wherein the default state is an off state.

9. The method of claim 1 wherein at least one controller is a controllable controller including a selector for indicating to the network that the controllable controller is being removed from the network via a removal signal and the step of generating a control list includes the steps of, when a removal signal is received, determining if the controllable controller associated with the removal signal is in the control list and, where the associated controllable controller is in the control list, removing the associated controllable controller from the list.

10. The method of claim 1 wherein each controller includes a list of active network controllers and the step of monitoring the network includes the step of comparing the active list to the control list, controllers that appear on the control list and not on the active list being non-communicating controllers.

11. A controller to be used with a peer-to-peer control network, the network including a plurality of active controllers, a controller provided for each controller, controllers associated with active controllers being active controllers, the controllers communicating via a network bus wherein each controller is controllable by at least two other controllers, a controller that has controlled another controller being a controlling controller, the controllers used to maintain network control when a controlling controller becomes a non-communicating controller, a non-communicating controller being a controller that cannot communicate with other controllers, each individual controller comprising:

a memory for storing a control list including controlling controllers that have controlled the individual controller;

a processor receiving network signals and determining when a controlling controller controls the individual controller;

a list keeper for generating the control list;

an identifier to determine when one of the control list controllers becomes a non-communicating controller; and a list clearer that, when a non-communicating controller is identified, clears the non-communicating controller from the control list and sets control of the individual controller to a default state.

12. The controller of claim 11 wherein the processor includes a designation determiner for determining if network signals are control signals designated for the individual controller.

13. The controller of claim 11 wherein the list keeper includes a list associator for determining if an identified controlling controller is included in the control list and that, when the identified controlling controller is not included in the control list, adds the controlling controller to the control list.

14. The controller of claim 11 wherein the peer-to-peer network is a token passing network where active controllers communicate via the network bus in an ordered sequence, each active controller operating for some portion of a network cycle and, wherein, the identifier includes an operational determiner to determine when, during a network cycle, one of the control list controllers has not been operational.

15. The controller of claim 14 wherein the operational determiner includes a comparator that determines when a controller that operated during a previous network cycle fails to communicate when it is supposed to in the ordered sequence of a current network cycle, the failed controller being a non-communicating controller, and, when a non-communicating controller is identified, determines if the non-communicating controller is in the control list.

16. The controller of claim 11 wherein the default state is an off state.

17. The controller of claim 11 wherein at least one controller is a controllable controller including a selector for indicating that the controllable controller is being removed from the network via a controller removal signal and the list keeper includes a list modifier that, when a removal signal is received, determines if the corresponding controllable controller is in the control list and, where the controllable controller is in the control list, removes the controllable controller from the control list.

18. The controller of claim 11 wherein the controller includes a timer and the identifier determines when one of the control list controllers becomes a non-communicating controller by determining when a control list controller fails to provide a signal to the network for a predetermined timer period.

19. The controller of claim 18 wherein the identifier determines when one of the control list controllers becomes a non-communicating controller by determining when a control list controller fails to provide a signal for the predetermined timer period to the network designating the individual controller as the recipient of the signal.

* * * * *